US009113438B2

(12) United States Patent
Kuchibhotla et al.

(10) Patent No.: US 9,113,438 B2
(45) Date of Patent: Aug. 18, 2015

(54) APPARATUS AND METHOD FOR MOBILE ASSIGNMENT

(75) Inventors: Ravi Kuchibhotla, Gurnee, IL (US); Niels Peter Skov Andersen, Roskilde (DK)

(73) Assignee: Google Technology Holdings LLC, Mountain View, CA (US)

( * ) Notice: Subject to any disclaimer, the term of this patent is extended or adjusted under 35 U.S.C. 154(b) by 2673 days.

(21) Appl. No.: 11/029,256

(22) Filed: Jan. 4, 2005

(65) Prior Publication Data

US 2005/0197120 A1 Sep. 8, 2005

Related U.S. Application Data

(63) Continuation-in-part of application No. 10/680,662, filed on Oct. 7, 2003, now abandoned.

(51) Int. Cl.
| | |
|---|---|
| *G06F 15/16* | (2006.01) |
| *H04W 60/04* | (2009.01) |
| *H04W 48/08* | (2009.01) |
| *H04W 68/00* | (2009.01) |
| *H04W 88/06* | (2009.01) |
| *H04W 92/02* | (2009.01) |

(52) U.S. Cl.
CPC ............ *H04W 60/04* (2013.01); *H04W 48/08* (2013.01); *H04W 68/00* (2013.01); *H04W 88/06* (2013.01); *H04W 92/02* (2013.01)

(58) Field of Classification Search
USPC ............... 709/222, 227, 231, 232; 455/404.2, 455/422.1, 432.1, 454, 456.1; 370/431, 370/432, 438
See application file for complete search history.

(56) References Cited

U.S. PATENT DOCUMENTS

| | | | |
|---|---|---|---|
| 5,442,806 | A | 8/1995 | Barber et al. |
| 5,862,480 | A | 1/1999 | Wild et al. |
| 5,946,634 | A | 8/1999 | Korpela |
| 6,085,110 | A | 7/2000 | Nilsson |
| 6,212,390 | B1 | 4/2001 | Rune |
| 6,223,030 | B1 | 4/2001 | Van Den Heuvel et al. |
| 6,463,259 | B1 | 10/2002 | Kim |
| 6,539,237 | B1 | 3/2003 | Sayers et al. |

(Continued)

FOREIGN PATENT DOCUMENTS

| | | |
|---|---|---|
| EP | 1096728 A2 | 5/2001 |
| EP | 1263247 A1 | 12/2002 |

(Continued)

OTHER PUBLICATIONS

3GPP TS 23.236 V5.2.0 (Mar. 2002); 3rd Generation Partnership Project; Technical Specification Group Services and System Aspects;Intra-domain Connection of Radio Access Network (RAN) nodes to multiple Core Network (CN) nodes; (Release 5) XP-002434580; 36 pages.

(Continued)

*Primary Examiner* — Mohamed Ibrahim
(74) *Attorney, Agent, or Firm* — Lerner, David, Littenberg, Krumholz & Mentlik, LLP

(57) ABSTRACT

An apparatus and method support user devices (109-113) and multiple core networks (125, 126) with a network. A rule set for a user device is associated with a core network (125, 126). Access information associated with a network is converted to core network behaviors using the rule set. A network element (400) can be employed to map the network information to core network information using the rule set for network uses.

19 Claims, 6 Drawing Sheets

(56) References Cited

U.S. PATENT DOCUMENTS

| | | |
|---|---|---|
| 6,567,667 B1 | 5/2003 | Gupta et al. |
| 6,741,868 B1 | 5/2004 | Park et al. |
| 6,782,274 B1 | 8/2004 | Park et al. |
| 6,792,277 B2 | 9/2004 | Rajaniemi et al. |
| 6,795,708 B1 | 9/2004 | Patel |
| 6,801,786 B1 | 10/2004 | Korpela |
| 6,873,615 B2 | 3/2005 | Ratzel |
| 6,950,419 B1 | 9/2005 | Park et al. |
| 7,280,516 B1 | 10/2007 | Costa et al. |
| 7,305,251 B2 | 12/2007 | Kuchibhotla et al. |
| 7,561,879 B2 | 7/2009 | Kuchibhotla et al. |
| 2001/0005678 A1 | 6/2001 | Lee |
| 2001/0046859 A1 | 11/2001 | Kil |
| 2002/0072363 A1 | 6/2002 | Riihinen et al. |
| 2002/0086670 A1* | 7/2002 | Rajaniemi et al. ............ 455/426 |
| 2002/0116384 A1 | 8/2002 | Laurila et al. |
| 2002/0119774 A1 | 8/2002 | Johannesson et al. |
| 2002/0147012 A1 | 10/2002 | Leung et al. |
| 2002/0193139 A1 | 12/2002 | Mildh et al. |
| 2003/0028644 A1 | 2/2003 | Maguire et al. |
| 2003/0040311 A1 | 2/2003 | Choi |
| 2003/0040313 A1 | 2/2003 | Hogan et al. |
| 2003/0040314 A1* | 2/2003 | Hogan et al. ................. 455/435 |
| 2003/0099219 A1 | 5/2003 | Abrol et al. |
| 2003/0119481 A1 | 6/2003 | Haverinen et al. |
| 2003/0134636 A1* | 7/2003 | Sundar et al. ................ 455/432 |
| 2004/0014484 A1 | 1/2004 | Kawashima |
| 2004/0017798 A1 | 1/2004 | Hurtta et al. |
| 2004/0072578 A1* | 4/2004 | Keutmann et al. ......... 455/456.1 |
| 2004/0105429 A1 | 6/2004 | Anckar et al. |
| 2004/0162077 A1 | 8/2004 | Kauranen et al. |
| 2004/0202736 A1 | 10/2004 | Hernandez Munoz et al. |
| 2004/0258019 A1 | 12/2004 | Haumont et al. |
| 2005/0003829 A1 | 1/2005 | Lala et al. |
| 2005/0020276 A1 | 1/2005 | Maanoja et al. |
| 2005/0070281 A1 | 3/2005 | Rajkotia et al. |
| 2005/0117540 A1 | 6/2005 | Kuchibhotla et al. |
| 2005/0181788 A1* | 8/2005 | Muhonen ................... 455/432.1 |

FOREIGN PATENT DOCUMENTS

| | | |
|---|---|---|
| EP | 1349413 A1 | 10/2003 |
| EP | 1349413 B1 | 4/2007 |
| WO | 9837721 A2 | 8/1998 |
| WO | 9931917 A2 | 6/1999 |
| WO | 0103463 A1 | 1/2001 |
| WO | 0191370 A1 | 11/2001 |
| WO | 02058336 A2 | 7/2002 |
| WO | 02076133 A1 | 9/2002 |

OTHER PUBLICATIONS

Supplemental Search Report; Counterpart EPC Patent Application No. 04794201.6, Jun. 4, 2007; 5 pages.

EPC Exam Report; Counterpart EPC Patent Application No. 04794201.6, Oct. 4, 2007; 5 pages.

SIPO 1ST OA with English Translation; Counterpart Chinese Patent Application No. 200400292711.4, Jun. 27, 2008; 14 pages.

SIPO 2ND OA with English Translation; Counterpart Chinese Patent Application No. 200400292711.4, Mar. 20, 2009; 11 pages.

3GPP TS 22.011 V6.1.0 (Jun. 2003); 3rd Generation Partnership Project; Technical Specification Group Services and System Aspects; Service Accessibility; Release 6 (Jun. 2003) 12 pages.

ETSI TS 122 011 V3.8.0 (Sep. 2002); Digital Cellular Telecommunications System (Phase 2+); Universal Mobile Telecommunications System (UMTS); Service Accessibility (3GPP TS22.011 version 3.8.0 Release 1999); 16 pages.

3GPP TS 23.122 V5.2.0 (Dec. 2002); 3rd Generation Partnership Project; Technical Specification Group Core Network; NAS Functions related to Mobile Station (MS) in idle mode (Release 5) 33 pages.

ETSI TR 122 951 V6.1.0 (Mar. 2003); Digital Cellular Telecommunications System (Phase 2+); Universal Mobile Telecommunications System (UMTS); Service Aspects and Requirements for Network Sharing (3GPP TR 22.951 version 6.1.0 Release 6) XP-002317360; 22 pages.

3GPP TSG-GA WG2 Meeting #28 Tdoc S2-023356; Bankok, Thailand; Network Sharing Considerations; Nov. 11, 2002; XP-02280267 6 pages.

* cited by examiner

APPARATUS AND METHOD FOR MOBILE ASSIGNMENT

CROSS-REFERENCE TO RELATED APPLICATIONS

The present application is a continuation-in-part of U.S. patent application Ser. No. 10/680,681, filed on Oct. 7, 2003 and entitled "METHOD AND APPARATUS FOR ROUTING MESSAGES IN A NETWORK," which is related to U.S. patent application Ser. Nos. 10/680,690, 10/680,522, and 10/680,662, all of which were filed on Oct. 7, 2003. The disclosures of each application listed above are incorporated herein by reference.

This application is also related to application entitled "method for SELECTING A CORE A NETWORK," application Ser. No. 10/680,690, filed on Oct. 7, 2003 and commonly assigned to the assignee of the present application and which is hereby incorporated by reference.

This application is also related to application entitled "WIRELESS ACCESS NETWORK SHARING AMONG CORE NETWORKS AND METHODS," application Ser. No. 10/680,522, filed on Oct. 7, 2003 and commonly assigned to the assignee of the present application and which is hereby incorporated by reference.

This application is also related to application entitled "APPARATUS AND METHOD FOR SHARED NETWORK," application Ser. No. 10/680,681, filed on Oct. 7, 2003 and commonly assigned to the assignee of the present application and which is hereby incorporated by reference.

FIELD OF THE DISCLOSURE

The present disclosure is directed to apparatuses and methods for supporting mobile location assignment in a network.

BACKGROUND

Presently, communication systems generally include a network operator serving user devices through a dedicated access network. For example, wireless communication systems in general comprise a Radio Access Network (RAN) and a core network (CN). The RAN includes base stations and associated radio network controllers providing wireless communication links with user devices (UDs), also referred to herein as user equipment (UE). The core network receives messages from a public switched telephone network (PSTN), other mobile stations, the Internet, other core networks, and other network entities. The wireless communication system is coupled to other wireless communications systems, but each respective system is typically operated by one operator or carrier. Such systems are currently used for landlines such as cable and twisted wire pair systems, and wireless systems such as Global System for Mobile communication (GSM), other time division multiple access (TDMA) systems, and code divisions multiple access (CDMA) networks for example.

In some mobile communications systems the mobile device is required to perform a location update at certain times. For example, in GSM and UMTS systems the mobile is required to perform a location update or a routing area update whenever it is determined that the mobile has changed its location area or routing area. The change in location determination may be based on received broadcast information. Other reasons for a location update include expiration of a periodic timer for the location update, a registration message such as a first International Mobile Subscriber Identity (IMSI) attach, and a variety of other occurrences or events. In order to perform the location update the mobile reads the broadcast information, determines that the location area has changed, and requests a radio channel from the network. In GSM systems, the network allocates a Standalone Dedicated Control Channel (SDCCH) for the mobile to use to transmit the location update message. In UMTS systems, the network allocates a Radio Resource Control (RRC) connection.

In certain network configurations, the boundaries of location areas are such that there are very frequent location area changes as determined by the mobile reading of the broadcast information. For example, the location area seam may run parallel to and in the middle of a major roadway, such as a heavily traveled expressway. In such cases, during peak traffic times (such as a so-called "rush hour"), the mobile may fail to receive an SDCCH allocation due to load/resource constraints at the network. The mobile is therefore unable to receive an SDCCH allocation and consequently will subsequently fail to inform the network of its change in location area.

Location areas are used by the core network to track the mobile in idle mode. For example, the network will determine the appropriate paging area to be used when a page is to be sent to the mobile. When the mobile fails to update the network of a change in its location area, the network may send the page to the radio networks corresponding to the wrong location area such that the mobile will fail to receive the paging message, causing a missed connection with the subscriber and a loss of revenue to the operator.

In the case of wireless systems, although each system operator generally uses one type of system, e.g., either CDMA, wideband CDMA (WCDMA) or TDMA, operators may operate multiple systems in a geographic area in an effort to use legacy systems to insure full coverage. For example, an operator may have an analog system and a CDMA system, or an analog system and a TDMA system, or a TDMA system and a third-generation system. Additionally, a number of operators may cover the same geographic area, wherein each operator using its own network. Each wireless communication system operates in an assigned frequency band, also called a spectrum, as there are only a finite number of available bands. However, with the current systems the system operator links the RAN to a single core network. The RAN broadcasts a message that includes identifiers for the core network coupled to the RAN, such as a PLMN, location areas and routing areas for the core network, and the like. With such dedicated systems, the RAN can serve only a single core network.

It is desirable for communication systems to allow network operators to share resources. One example of a shared network resource is twisted wire connections and cables connected to residences and offices. This infrastructure is already installed, expensive to replace, and is available to multiple operators if the network owner desires resource sharing. Another example of a network that can be shared is the radio access network where it may be desirable to share resources by allowing multiple core networks, operated for example by different operators, to connect to users through a shared radio network controller (RNC) and its associated base stations. This allows multiple network operators to access subscribers using the same spectrum, and through the same radio access network. For example, a license holder of a particular spectrum may want to sell access via their radio access network to other network operators to offset the cost of the system, while operators who do not have a spectrum license in a geographical area may want to buy access to that spectrum from the license holder.

An additional challenge in wireless systems, such as the emerging universal mobile telephone system (UMTS), is to accommodate circuit switched and packet switched data. The routing of messages to one of many core networks is limited by the basis of the core network domain type, i.e., packet switched or circuit switched, and not by system operator, as only one system operator uses the radio network and the core network for both circuit switched and packet switched communications.

Thus, there is a need for an improved method of uniquely supporting multiple user devices.

BRIEF DESCRIPTION OF THE DRAWINGS

Exemplary embodiments of the present invention will be described with reference to the following figures, wherein like numerals in different figures designate like elements and which embodiments are provided to illustrate various principles and advantages of the invention defined by the claims, and wherein:

DETAILED DESCRIPTION

Figure 1:
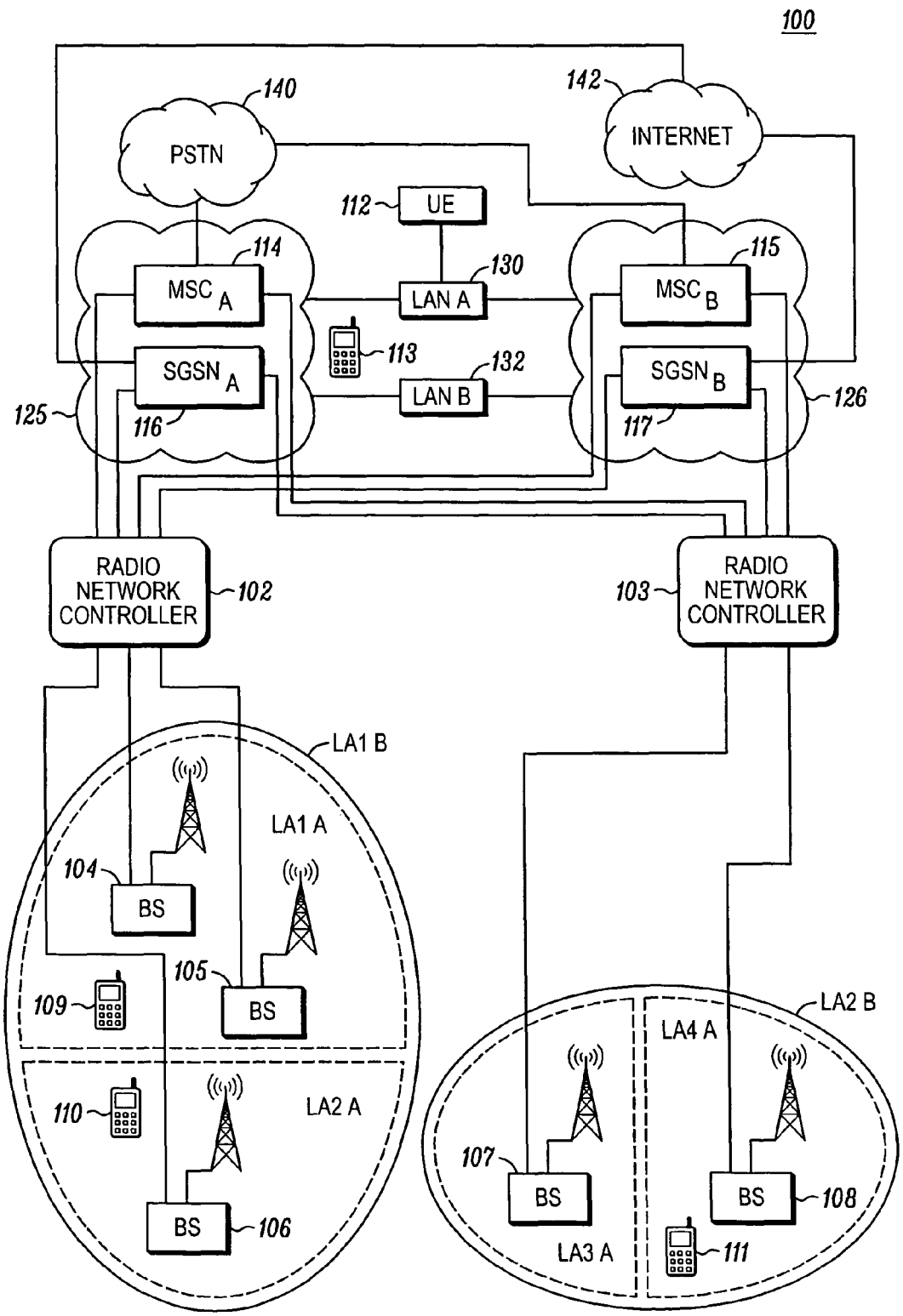
FIG. 1 is a diagram illustrating an exemplary wireless communication system.

Existing shared networks are not able to accommodate multiple core networks where the user devices need to be uniquely controlled for respective core network operators. It is a challenge to accommodate different desired behaviors for different operators with a shared network. For example, existing radio access networks are dedicated to a single operator, and thus establish that operator's desired behaviors from the user devices connected in the system. Where operators have different desired behaviors, the existing system is not able to accommodate different messaging protocols for each user device for the particular operator. An additional problem is providing different location identifiers through a single access network.

The core network and access network can be wireless (e.g., a wide area network and local area network) or hard-wired (e.g., twisted wire or coaxial cable). Wireless can be UMTS, GSM, and CDMA, wire line, circuit switched and packet switched, telephone and cable. The communication systems of interest are those that facilitate voice or data or messaging services over one or more networks. Examples of two-way systems include cable, land-line, wireless cellular systems, which use analog, CDMA, and TDMA technology, and are known as GSM and Universal Mobile Telecommunication Service (UMTS), 1G, 2G, 2.5G, 3G, 4G and beyond systems (where G refers to Generation) and variants or evolutions thereof. Furthermore, the systems may be wide area networks, local area networks, or combinations thereof, and the user devices of interest can support short-range communications, long-range communications, or both long and short-range communications. Examples of short range communications include cordless communications systems, piconetworks, wired or wireless LAN systems such as those supporting the IEEE 802.11 standard, Bluetooth connections, and the like. Such systems preferably utilize CDMA, frequency hopping, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System), or integrated digital enhanced network (iDEN™) protocol. Such systems may support trunk or dispatch functions, direct individual or group calling, and support circuit-switched, Internet or other connections.

User devices in such systems may include wired telephones, cellular telephones, cordless telephones, so-called Internet or Internet protocol phones, modems, routers, access points, computers, personal digital assistants, palm top devices, and variations and evolutions thereof.

The instant disclosure includes exemplary devices, systems, and methods, which disclose various embodiments. However, the structure and function disclosed is not intended to limit the invention, but rather to enhance an understanding and appreciation for the inventive principles and advantages. The invention is limited solely by the appended claims.

Terms used in the specification and claims may be associated by those skilled in the art with terminology appearing in a particular standard, such as CDMA, GSM or 802.11 standards, or such terminology may not appear in a particular standard. Association with a standard is not intended to limit the invention to a particular standard, and variance with the language in a particular standard does not preclude the invention from applying to such standard. Rather, the terms used are provided solely for the purpose of explaining the illustrated examples without unduly burdening the specification with multiple explanations to accommodate language variations with all possible standards, systems, and networks. It is further understood that the use of relational terms, if any, such as first and second, top and bottom, and the like are used solely to distinguish elements or actions without necessarily requiring or implying any actual such relationship or order between such entities or actions.

Those skilled in the art will recognize that the inventive functionality and many of the inventive principles may be implemented using software programs, hardware circuits such as integrated circuits (ICs), programmable logic devices, or a combination thereof. It is expected that one of ordinary skill, notwithstanding the amount of effort required and the many design choices driven by available time, current technology, and economic considerations, when guided by the concepts and principles disclosed herein will be readily capable of generating and selecting such software programs and/or ICs with minimal experimentation. In the interest of brevity and minimization of any risk of obscuring the principles and concepts according to the present invention, further discussion of such software and ICs, if any, will be limited to the essentials with respect to the principles and concepts used by the preferred embodiments.

With reference now to FIG. 1, an exemplary communication system in the form of a wireless communication system 100 is illustrated. The system 100 includes a radio network controller (RNC) 102 and an RNC 103, base stations 104-108, mobile switching center (MSC) A 114 and MSC B 115, Serving GPRS Support Node (SGSN) A 116 and SGSN B 117, and user devices (UD) 109-111. The RNCs 102 and 103 and the base stations 104-108 constitute a radio access network (RAN) in system 100. Core Network A 125 includes MSC A and SGSN A coupled to the RAN and to other entities, such as the public switch telephone network (PSTN) 140 and the Internet 142. Core network B 126 includes MSC B and SGSN B coupled to the RAN and to other entities, such as the PSTN 140 and the Internet 142.

Each of the core networks 125, 126 is associated with, for example, a different network operator and supports the network operator's connectivity, including billing, supervision, and feature support, and represents physical circuitry, software, and system functionality. Those skilled in the art will recognize that core networks can include other network entities, which may be software, hardware and/or functional in nature. In the exemplary system, the circuit switched interface to the public switched telephone network is via the MSC 114, 115 and packet switched interface to the Internet is via the SGSN 116, 117. Other connectivity paths may be supported. Information exchanged between a particular user device and the core network is routed appropriately via the radio access network. Additionally, although the exemplary embodiment shown in FIG. 1 includes only two core networks, it will be understood by those skilled in the art that a plurality of core networks may be coupled to a single, shared RAN. It will be recognized by those skilled in the art that a core network can be associated with a network operator, and that a shared network is an access network used to access subscribers, or user devices, by multiple core networks. For example, a shared radio access network may have elements such as base stations and radio network controllers that respectively provide connectivity to more than one network operator, and further that the shared radio access network may support multiple user device behaviors unique to each network operator through a single base station and radio network controller.

The base stations 104-108 transmit acceptance messages and broadcast messages. Acceptance messages refer to initial messages including a rule set for a user device, and may for example be a registration accept message such as the location update accept message used in GSM systems. A broadcast message is a message transmitted to user devices and responsive to which user devices are expected to exhibit a desired behavior. Such behavior may include performing an operation or refraining from performing an operation.

In FIG. 1, the system 100 includes exemplary local area networks (LANs). LAN A 130 is illustrated as a wired LAN serving user device 112. LAN B 132 is illustrated as a wireless LAN serving user device 113. It is envisioned that the LANs can be within the coverage area of one of the base stations, and that handoff of user device 113 from the wireless LAN to the cellular network may occur.

Figure 2:
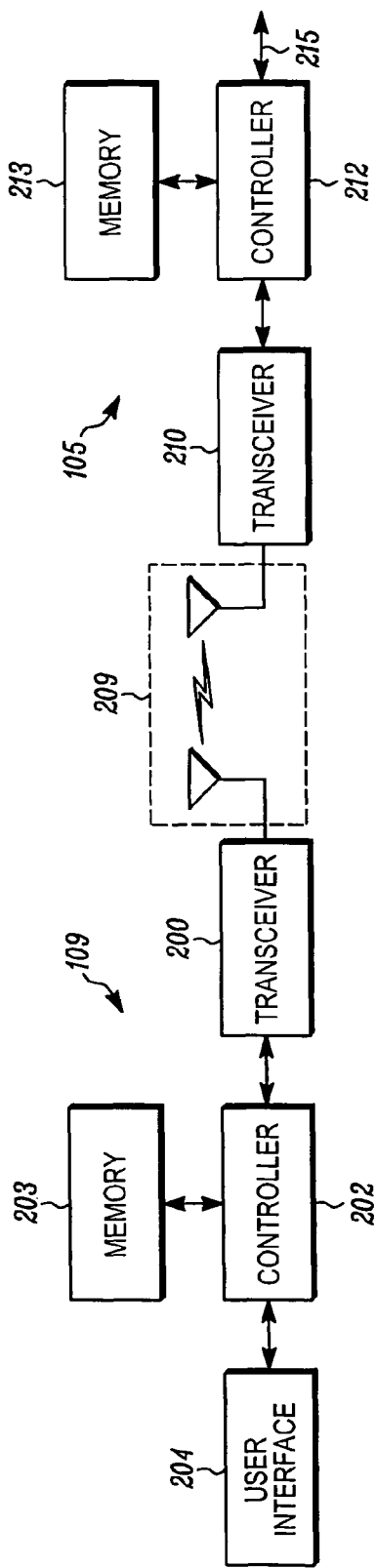
FIG. 2 is a circuit schematic in block diagram illustrating an exemplary user device communication link.

FIG. 2 illustrates an exemplary user device 109 including a radio transceiver 200 for communicating with a base station via a communication link 209. The transceiver may be for a wired or wireless communication link, a single transceiver, such as a cellular telephone receiver or a data modulator/demodulator, or it may include multiple transceivers such as multiple cellular transceivers, or an 802.11 transceiver and a cellular radio transceiver, an Ethernet transceiver and a cellular transceiver, or any other combination of wired and wireless transceivers. A controller 202 includes processing and memory 203 for controlling the user device operation. The controller may include a micro-controller and memory, and the memory may be volatile and/or non-volatile memory. As used herein, micro-controller can be implemented using any microprocessor, digital signal processor, programmable logic, discrete logic units, software processes, a combination thereof, or the like. The user device will typically include a user interface 204, such as a keypad, touch screen, speaker and microphone.

Those skilled in that art will recognize that the access network, which in the illustrated example includes base stations, will similarly include a transceiver 210 and controller 212, with memory 213, for communicating with user devices. The base station will include additional circuitry (not shown) for communicating with the RNC.

Figure 3:
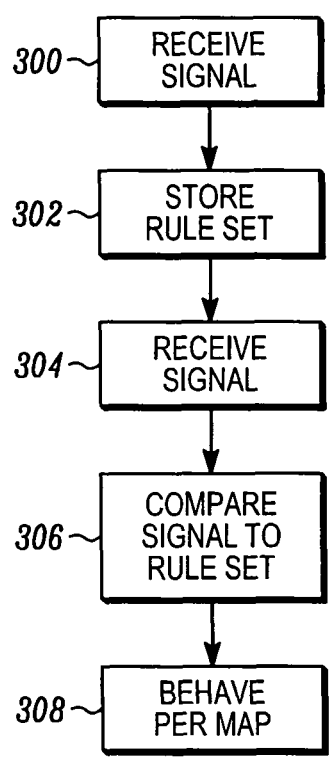
FIG. 3 is a diagram illustrating exemplary operation of a user device.

Operation of the user equipment, also referred to as user devices, (e.g., device 109-110 in FIG. 1) is illustrated in FIG. 3. The user device receives via transceiver an acceptance message at 300. This message may for example be received when the user device registers on the system, for example, system 100 in FIG. 1. The acceptance message includes a rule set representing the desired behaviors for the user device, and the rule set is stored in memory of controller, at 302 in FIG. 3. It is envisioned that this rule set will be dependent upon the core network serving the device, and that the rule set will be temporarily stored in the device. Thereafter, the user device will receive broadcast messages through transceiver, as indicated at 304. The broadcast message will include access information and may include updated rule sets. After receiving the broadcast message, the controller will compare the access information with the stored rule, as indicated at 306. The controller will determine if the access information in the broadcast message indicates a particular behavior, or if the rule set has been updated. The controller will control the user device to act according to the received access information as indicated at 308. If an updated rule set is received, the controller will store the updated rule information either by editing the rule set to include the changes, or store the new rule set in memory in place of the old rule set. The behavior of the user device responsive to the access information will be according to the current rule set, which will be the previously stored rule set if no update has occurred or the updated rule set if the access information is communicated with an update.

Figure 4:
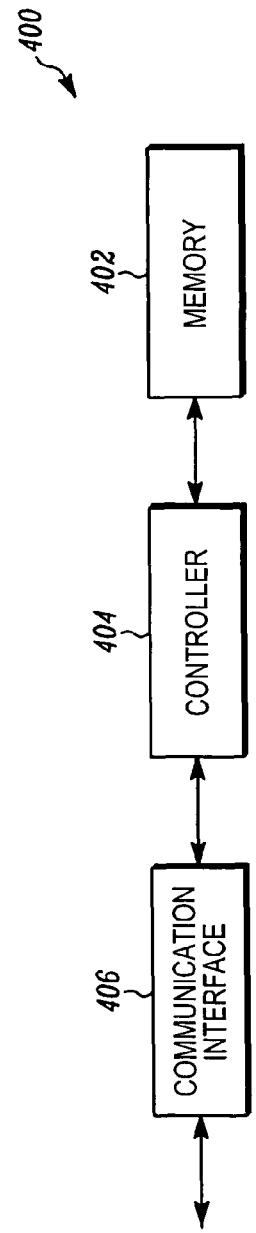
FIG. 4 is a circuit schematic in block diagram illustrating an exemplary embodiment of a network element.

In FIG. 4, the system will include a network element 400, which may be implemented in memory 402 and a controller 404. The controller includes a micro-controller and is connected through a communication interface 406. The communication interface is any suitable interface facilitating communication between the controller and a network entity requiring translation between the core network information and the access network information, and thus facilitates communications with any part of the system, for example, the communication system 100 in FIG. 1. In FIG. 4, the memory 402 can be implemented using any suitable memory, which may be integrated with micro-controller 404 or the memory may be discrete, and may be of the volatile or non-volatile type. The network element 400 can be located in the core network 125, 126, the radio network controller 102, 103, the base stations 104-108, or other network entities (not shown, but the OMB of FIG. 6 for example). In FIG. 4, the network element 400 is, for example, responsible for establishing a new connection to a user device, and establishing the rule set to be used by the communication device and the network in association with the communication device. The network element establishes respective rule sets for user devices connected to each core network, and thus can advantageously be implemented in the mobile switching centers and the SGSNs. Alternatively, a rule set for a particular user device can be constructed at the radio network controller when a user device is registered on the system for a particular core network.

Figure 5:
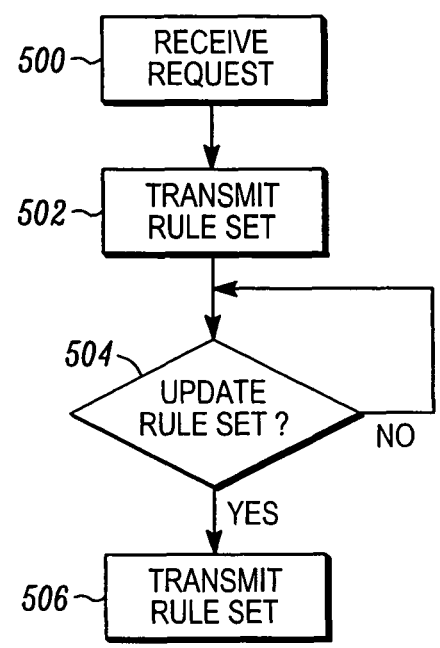
FIG. 5 is a flow chart illustrating exemplary operation of a network element.

Operation of the network element 400 of FIG. 4 will now generally be described with respect to FIG. 5. The network element will establish a need to communicate with a target user device or user devices for a variety of different reasons, as is know in the art. It is envisioned, that when a user device (e.g., one of the devices 109-111 in FIG. 1) registers on the system, it will be assigned to a core network, for example, one of the core networks 125, 126 in FIG. 1. At that time, the rule set for the core network that will be connecting the user device will be communicated from the network element to the user device. The communications interface (e.g., the interface 406 in FIG. 4) will receive an input, indicated at block 500 in FIG. 5, indicating that a particular user device requires a rule set, for example for establishing registration on the system, or that a network entity requires the rule set, for example to contact a user device. In FIG. 4, the network element controller 404 thus provides (if the rule set is uniform for all associated devices when created such as where the network element resides in the core network for example), or constructs and communicates (if the rule set is different for associated devices when created, such as where the network element resides in the RNC and is constructed differently depending on whether the device will be associated for network A or network B for example), the rule set from memory 402, as indicated in step 502 in FIG. 5. If the rule set is to be changed, for example where the operator is altering the core network behavior, indicated in step 504, the user controller will provide an updated rule set as indicated in block 506.

Alternatively to the network element mapping the rule set, it is envisioned that the rule set may be attached to a paging request communicated from the core networks to the access network. The access network can then apply the rule set to determine how the access core network information will be converted to access network information.

Figure 6:
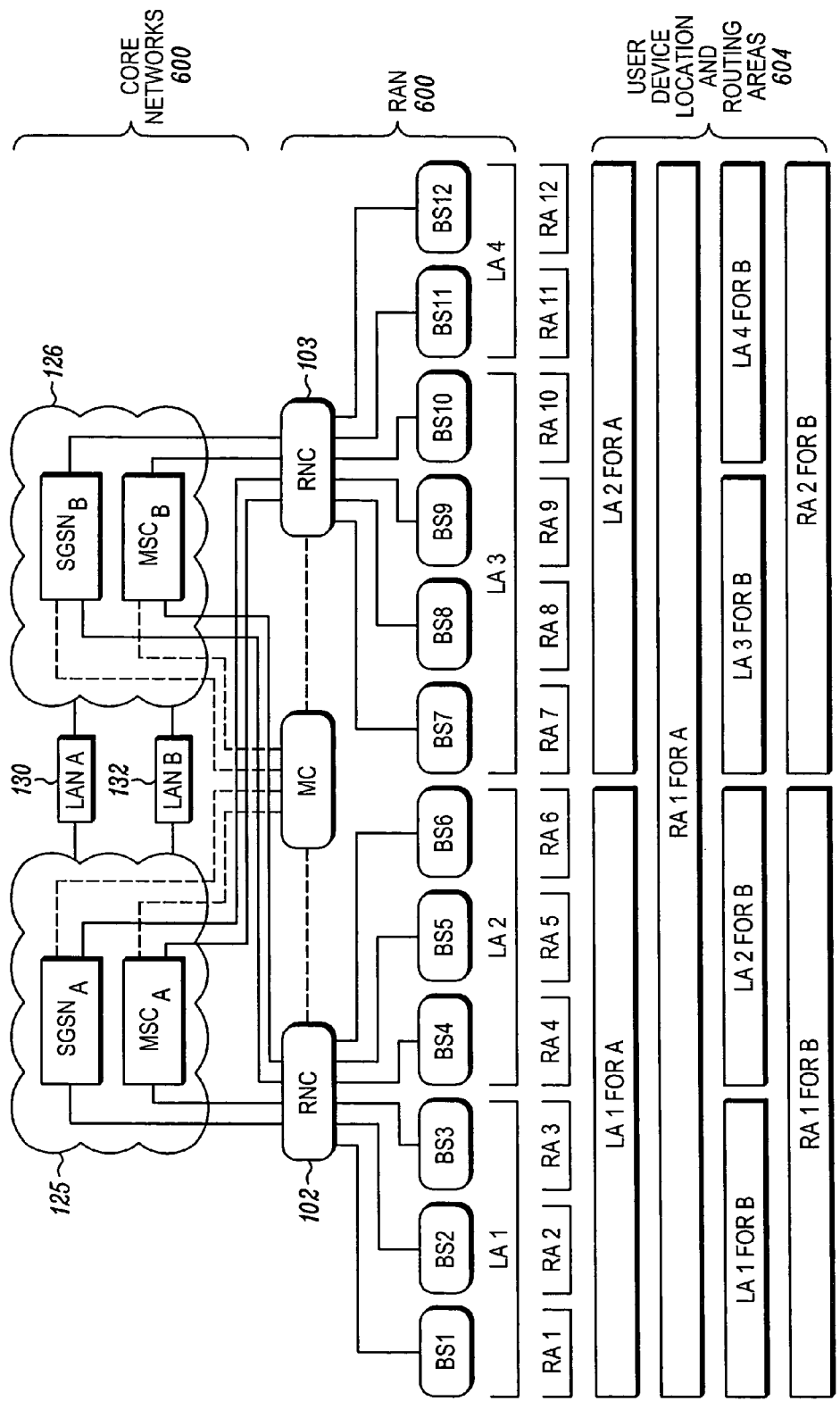
FIG. 6 is a diagram illustrating an exemplary wireless communication system.
Figure 7:
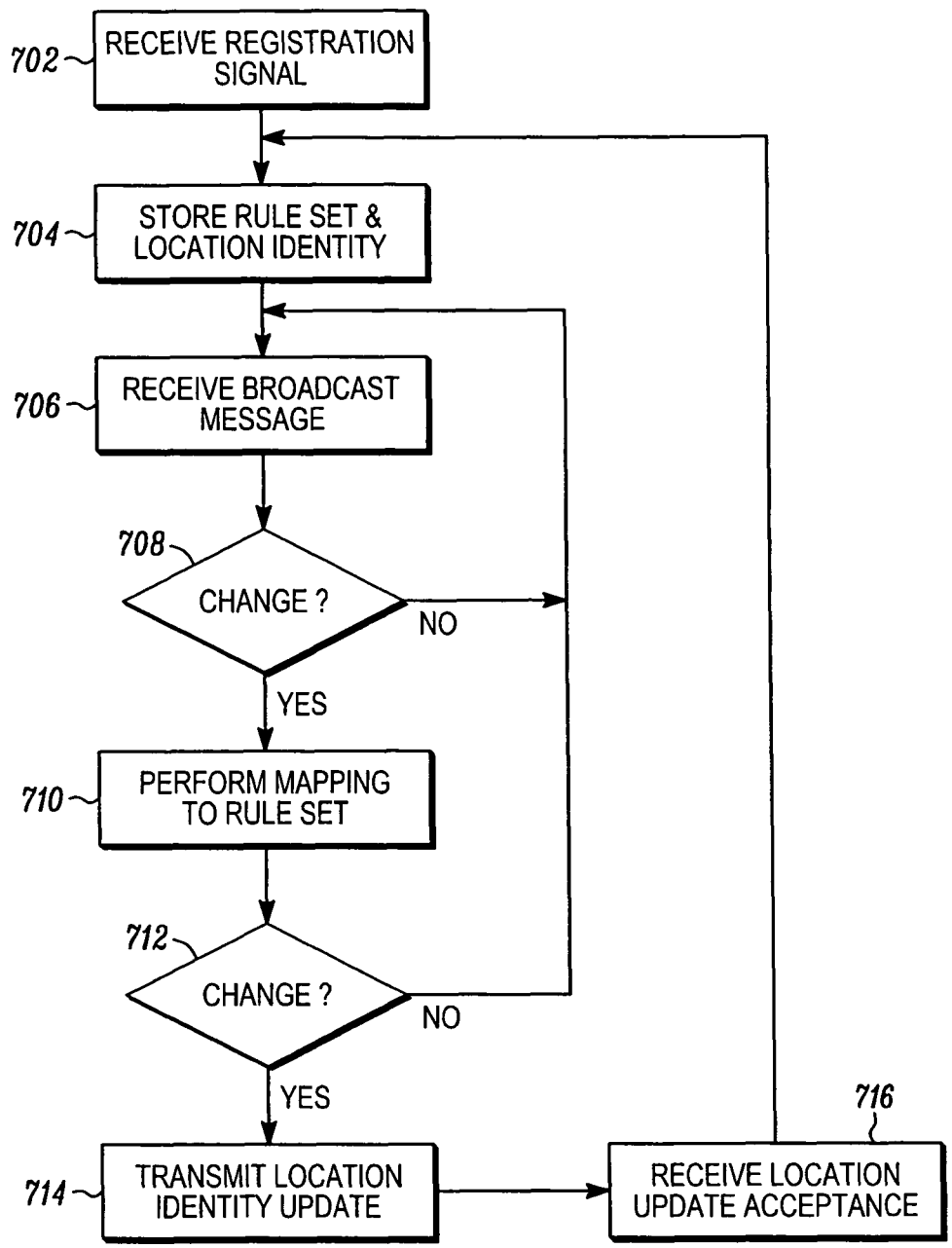
FIG. 7 is a flow chart illustrating location identification in a user device.
Figure 8:
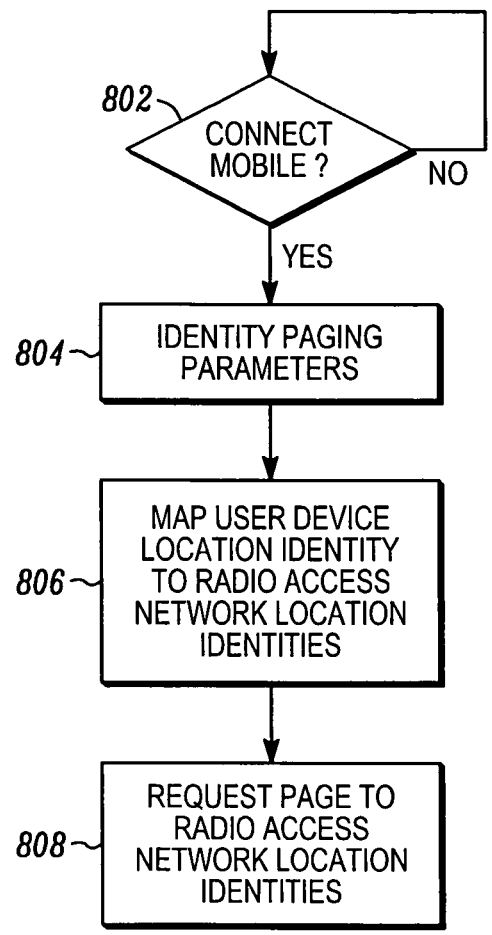
FIG. 8 is a flow chart illustrating an exemplary message routing operation of the user device.

A more particular example will now be described with reference to FIGS. 6-8. A shared radio access network 600, access networks, 130, 132, core networks 602 (does not include access networks 130, 132), and user device location identifications 604 are illustrated in FIG. 6. Each of the base stations broadcasts a location area identity (LAI) and routing area identity (RAI) that are pre-assigned. These may be referred to herein as location areas and routing areas, respectively. These are the shared access network location areas and routing areas, which are different in the illustrated example, but the base stations could alternatively broadcast routing areas and location areas that are the same. In the illustrated diagram, base stations 1-3 broadcast location area 1. Base stations 4-6 broadcast location area 2. Base stations 7-10 broadcast location area 3 and base stations 11-12 broadcast location area 4. Each of the base stations broadcasts a different, respective routing area. Although these location areas are predetermined, the core networks 125, 126 may desire that different location areas and routing areas be provided for the user devices associated with the respective core networks. This presents a problem as the location areas are identified in broadcast messages, to all devices in communication with the user device, in GSM systems.

Operation of a user device (e.g., device 109 in FIG. 1) to receive dynamic location assignment will now be described with reference to FIG. 7. The user device receives registration accept signal at 702 from the base station via transceiver (e.g., the transceiver 200 of FIG. 2). The registration accept signal, or message, may include the mapping information, or a rule set to be used initially by the user device. This rule set and the access location identity, if present, are stored in memory as indicated at 704. Thereafter the user device will receive broadcast messages via transceiver as indicated in step 706. If the received access network location identity is different than the stored access network location identity, as determined at 708, the controller will map the access network location identity to the core network location identity, as indicated at 710. The controller will then compare the core network location identity stored in memory to the newly mapped, or converted, core network location identity, to determine if it has changed as indicated at 712. Only when the core network access identity has changed will the user device detect a cell change. The user device will then transmit the mapped core location identity to the core network in a location identity update signal, or message, as indicated at 714. The user device will receive a location update acceptance message at 716. This update may or may not include a rule set update. If not, the user device will wait to receive the next broadcast message at 706 without updating the rule set at 704. In the event that the location identity for the access network does not change, as determined at 708, or the core network location identity does not change, as determined at 712, the user device will return to wait for the next broadcast message at 706.

It will be recognized by those skilled in the art that the controller can map the received shared location identity to the core network location identity using a number of methods. One possible embodiment is converting the shared location identity using the rule set. It will also be recognized that location identity can be a network identity for a wired system, and more particularly a service set identifier (SSID) for LANs.

Location identities for wireless networks include location areas used by the MSCs, and routing areas used by the SGSNs. Thus, in FIG. 6, broadcasts of location areas 1 and 2 from the base stations BS1-BS6 will be mapped to location area 1 for user devices associated with MSC A, whereas user devices associated with MSC B will map broadcast location area 1 to location area 1, and map location area 2 to location area 2. Similarly, user devices associated with core network A will map base stations BS7-BS12 location area transmissions to location area 2. User devices associated with MSC A will map base stations BS7-BS10 location areas to location area 3 and base station BS11 and BS12 location areas to location area 4. It will be recognized that the routing areas used for the SGSN A and SGSN B can be the same or different from the location areas. In the illustrated example of FIG. 6, user devices associated with SGSN A will map all of the respective routing areas from base station BS1-BS12 to routing area 1 for SGSN A, whereas user devices associated with SGSN B will map the routing areas from base station BS1-BS6 to routing area 1 and map routing areas from base stations BS7-BS12 to routing area 2.

In summary, the controller (e.g., controller 202 in FIG. 2) will determine if the core network location identity has changed. In other words, when the user device moves from BS3 to BS4 in FIG. 6, if MSC A serves the user device, the user device will treat it as no location change. If however, MSC B serves the user device, the user device will treat it as a location area change from location area 1 to location area 2. In the case of a user device served by MSC B, the core location identity will be updated and stored in memory (e.g., memory 203 of FIG. 2), and the transceiver will be used to transmit the new core location identity to the network through BS4. As a default, it is envisioned that where mapping information is not present (not provided to the user device), the user device will use the access network location areas as broadcast for the core network location identities. The user device will thus periodically perform cell re-selection uniquely for each core network. The rule set informs the user device how to associate the location areas of the radio access network with the desired unique location areas for the respective network operators.

The network will periodically determine if it is necessary to establish a connection with a registered device. For example, it may be necessary to page a user device to complete an incoming call. This process is described with respect to FIG. 8. When it is necessary to page the user device, as determined at 802, the core network will notify the network element (e.g., network element 400 of FIG. 4). The controller of the network element stores the last location for the target user device and will convey this to the radio network controller building the page message. The location area of the user device will be mapped to the location area for the radio network controller base stations, as indicated at 806. The radio access network will be informed to broadcast the page message to all base stations associated with the user devices location identity. Thus, in FIG. 6, for a user device in location area 1 and associated with MSC A, base stations BS1-BS6 will page the user devices. For user device in location area 1 and associated with MSC B, the page will be communicated only via base stations BS1-BS3. In this manner, the location identity rule set can be used. A network element determines the last location area identity of the user device, and the stored rule set for the target user device at 806. The rule set is used to determine which access network base stations are associated with the core network location areas for the particular core network trying to establish connection. Thus, the rule set will establish the access network base stations that will be requested to transmit the page at 808. The page will only be sent over the area mapped for the network operator, and the mapped area may be unique for each network operator even though the shared access network is used. This permits a shared network to be used by more than one network operator, providing a unique configuration defined for each network operator, without over burdening network resources.

The above describes a new and advantageous operation of a shared network. It is envisioned that the assignment of mobile devices to mapped location areas can be advantageously employed in a network that is not shared. The location identity rule set can be applied to a mobile device in a network that is not shared to obtain a more even distribution of mobiles for the purpose of resource allocation and/or to reduce signaling.

In order to resolve the resource constraints of a non-shared network, the network transmits a message to the mobile that contains a rule set which the mobile uses to map the broadcast information to desired network behavior. For example, a mobile that is moving on a heavily traveled road where there is substantial mobile equipment usage can be instructed by the network to treat certain location areas that border one another as equivalent location areas. Such equivalent location areas will together constitute a mapped location area. When the mobile moves from one actual location area to another actual location area within a mapped location area, the mobile will treat the location areas as equivalent and will not perform a location area update (for example the mobile will not need an SDCCH allocation or an RRC connection for transmitting the location update message).

In such an environment, the network will perform the reverse mapping of the equivalent location areas to determine where to page the mobile based on the last actual location area update received from the mobile. The network will thus treat the location area of the mobile in which the page must be sent as a combination of actual location areas, and more particularly the last actual location area received from the mobile and all equivalent location areas within the mapped location area as determined by the rule set sent to the particular mobile. In this manner, even though the mobile may have changed actual location areas, while the mobile is within an equivalent or mapped location area the mobile will not miss pages. Different mobiles may be assigned different rule sets in order to optimize the system loading. For example, the network will assign different mobiles to different combinations of actual location areas so as to balance the paging loads in the various actual location areas. In this manner, the network can prevent a detrimental increase in potential paging load within a particular cell, or the network can manage other resource loading issues as desired by the network operator.

Thus it can be seen that an improved methods and apparatuses are disclosed. While this invention has been described with specific embodiments thereof, it is evident that many alternatives, modifications, and variations will be apparent to those skilled in the art. For example, various components of the embodiments may be interchanged, added, or substituted in the other embodiments. Various changes may be made without departing from the spirit and scope of the invention.

What is claimed:

1. A method of operating a wireless user device in a network, comprising:
   receiving, at the wireless user device, a signaling message that includes a rule set associated with a core network;
   receiving, at the wireless user device, broadcast information including access information associated with a network; and
   applying the access information received to the core network rule set to determine a behavior of the wireless user device.

2. The method of claim 1, wherein the access information is a location identity.

3. The method of claim 2, wherein the location identity is a location area, and wherein the user device uses the rule set to translate the location area received into a mapped location area for the associated core network.

4. The method of claim 2, where the location identity is the network identity.

5. The method of claim 2, where the location identity is a service set identifier.

6. The method of claim 2, wherein the location identity is a routing area identity, and wherein the user device uses the rule set to translate the routing area received into a mapped routing area for the associated core network.

7. The method of claim 1, wherein the signaling message is a registration accept message.

8. The method of claim 1, wherein the signaling message is a location update accept message.

9. The method of claim 1, wherein the signaling message is a location update reject message.

10. The method of claim 1, wherein the signaling message is a registration reject message.

11. A method of operating a network element to support network sharing, comprising:
    detecting a call establishment event for a target user device;
    determining a current location identity of the target user device;
    mapping the current location identity of the target user device to access network location identities using a rule set associated with the target user device and a core network; and
    communicating a message according to the mapped access network location identities.

12. The method of claim 11, further including determining, in an access network, whether a location update accept communication needs to be sent to the target user device.

13. The method of claim 12, wherein the access network is a public land mobile network.

14. The method of claim 11, wherein the access network is local area network.

15. The method of claim 14, wherein the network element is in a core network, and further including transmitting a request to the local area network to broadcast a paging message on the mapped access network location identities.

16. The method of claim 11, communicating the message further comprises sending a request to a radio network controller to transmit the message to the mapped location identities.

17. The method of claim 11, wherein the network element is in the access network, and wherein communicating includes sending, in the access network, of a page according to the mapped access network location identities in response to a request from the core network including the access network location identities.

18. The method of claim 11 further comprising receiving a core network signaling message from a core network element wherein the rule set is attached to the core network signaling message.

19. A wireless user device, comprising:
a transceiver to transmit and receive signals,
the transceiver receiving a broadcast message from a radio access network, the broadcast message including a broadcast location identity associated with the access network; and
a controller coupled to the transceiver,
the controller configured to map the broadcast location identity associated with the access network to a serving core network location identity using a rule set to determine a mapped location identity, and the controller configured to detect a cell reselection event when the mapped location identity indicates that a core network cell reselection is detected.

* * * * *